Patented Apr. 21, 1931

1,801,340

UNITED STATES PATENT OFFICE

HANS FINKELSTEIN, OF UERDINGEN, NIEDERRHEIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CELLULOSE-NITRATE LACQUER

No Drawing. Application filed July 13, 1928. Serial No. 292,597.

The present invention relates to improved cellulose nitrate lacquers. The lacquer industry requires in most cases products which leave a transparent coherent coating after the solvent has been evaporated. Accordingly the solvent must be non-hygroscopic and capable of removing any turbidities in the lacquer coating which might arise in moist air due to the presence of diluents in the lacquer, and thus must warrant the coatings having the desired properties such as transparency, adhesiveness and resistance.

From this point of view the monomethyl ether of ethylene glycol is not a satisfactory solvent for cellulose nitrate, since when dissolving cellulose nitrate therein, the solution is inclined to dry with the formation of turbid coatings, especially when the air is not very dry, a property which is well known in practice as "blushing" or "blooming." Quite similar phenomena are experienced when diluents such as ethyl alcohol, benzene, methyl acetate or the like are added to the solution. The said properties of ethylene glycol monomethyl ether prevent a large use of this solvent, notwithstanding its otherwise valuable properties.

I have found that the said troubles can be overcome by employing mixtures of the ethylene glycol monomethyl ether in which from 80 to 20 parts of the said ether are present together with from 20 to 80 parts of a solvent corresponding to the general formula $HO-C_nH_{2n}-OR$ (in which R indicates an alkyl group with from 1 to 4 carbon atoms and $n$ means 2, 3 or 4 and the whole molecule contains at least 5 carbon atoms). The said mixtures readily dissolve cellulose nitrate and the solutions may contain large amounts of diluents such as benzene, toluene, xylene, low aliphatic alcohols containing, say, from 1 to 4 carbon atoms, benzine, methyl acetate and the like, an addition of a small quantity of butanol being especially advantageous. The solutions possess a smell which is not substantially stronger than that of similar solutions prepared with ethylene glycol mono-methyl ether alone. The solutions form clear coatings of high lustre also in moist air (relative moisture of say 60 to 80 per cent). The protection against the growing white of the lacquers increases with reducing the content thereof of glycol monomethyl-ether but also the nature and the amount of the other solvents employed are of a certain influence.

The said solvent mixtures are also capable of dissolving resins better than ethylene glycol monomethyl ether alone. Generally speaking, the dissolving power for resins is the greater, the smaller the content in the ethylene glycol monomethyl ether. This is of great importance in the production of cellulose nitrate lacquers containing resins.

The improved lacquer solutions may also contain other solvents such as esters, ketones and the like and also plasticizers, colouring matters and other additions usual in the lacquer industry.

The following examples will further illustrate how the said invention may be carried out, but the invention is not limited thereto. The parts are by weight.

Example 1

100 parts of cellulose nitrate are dissolved in 300 parts of a mixture of 40 per cent of ethylene glycol monomethyl ether and 60 per cent of ethylene glycol monobutyl ether, whereupon 600 parts of a mixture of equal proportions of benzene and of ethyl alcohol of 94 per cent strength are added. The solution furnishes clear resistant coatings even in moist air.

Example 2

100 parts of cellulose nitrate, 30 parts of camphor and 20 parts of colophony are dissolved in 350 parts of a mixture of 20 to 80 per cent of ethylene glycol monomethyl ether and 80 to 20 per cent of butylene glycol monomethyl ether, whereupon 50 parts of butanol and 450 parts of a mixture of equal proportions of toluene and ethyl alcohol are added. The resulting lacquer forms clear coatings of a high lustre.

What I claim is:

1. A mixed solvent suitable for cellulose nitrate lacquers comprising from 80 to 20 parts of ethylene glycol monomethyl ether and from 20 to 80 parts of ethylene glycol monobutyl ether.

2. A mixed solvent suitable for cellulose nitrate lacquers comprising 60 parts of ethylene glycol monomethyl ether and 40 parts of ethylene glycol monobutyl ether.

3. A composition of matter comprising cellulose nitrate and a mixed solvent therefor containing from 80 to 20 parts of ethylene glycol monomethyl ether and from 20 to 80 parts of ethylene glycol monobutyl ether.

4. A composition of matter comprising cellulose nitrate and a mixed solvent therefor containing 60 parts of ethylene glycol monomethyl ether and 40 parts of ethylene glycol monobutyl ether.

In testimony whereof I have hereunto set my hand.

HANS FINKELSTEIN.